United States Patent Office 3,271,104
Patented Sept. 6, 1966

---

3,271,104
PROCESS FOR THE RECOVERY OF TUNGSTEN FROM ITS ORES
Joseph P. Surls, Jr., Walnut Creek, Calif., assignor to The Dow Chemical Company, Midland, Mich., a corporation of Delaware
No Drawing. Filed Feb. 7, 1963, Ser. No. 256,842
6 Claims. (Cl. 23—19)

This invention relates to a process for recovering tungsten values from tungsten bearing materials. More particularly it is concerned with a novel method for recovering high quality tungsten values in high yields from tungsten ores such as wolframite, ferberite, hubernite, scheelite, scheelite-powellite and the like.

Tungsten containing ores usually processed in this country and elsewhere in the world are scheelite ($CaWO_4$), scheelite-powellite ($CaWO_4 \cdot FeWO_4$) and wolframite (Mn, Fe)$WO_4$, scheelite being the most common. The scheelite and scheelite-powellite ore deposits generally contain as an impurity molybdenum, primarily as $CaMoO_4$, and molybdenum sulfide. The molybdenum sulfide readily is removed and separated, but the calcium molybdate, which is in isomorphic mixture with the scheelite, is not separable by traditional grinding and milling techniques. Conventionally, to recover and separate these constituents, i.e. molybdenum and tungsten, to provide high purity tungsten products substantially free from molybdenum these ores or ore concentrates are subjected to lengthy and complicated chemical dissolution methods, usually at moderately high temperatures and atmospheric or elevated pressures. The tungsten is recovered as precipitated crude tungsten oxide containing considerable quantities of impurities. Ordinarily the crude oxide is redissolved in an alkaline medium and the tungsten reprecipitated from solution. This dissolution and precipitation ordinarily is carried out at least two times after which the resulting tungsten oxide is treated with strong ammonia to convert it to the paratungstate. This product is separated from the reaction solution, dried and ignited thereby to provide a relatively high purity tungsten oxide.

Kasey (U.S. 2,801,152) alleges an improvement over the conventional and costly multi-step traditional art processes by treating finely divided tungsten ores at elevated temperatures with concentrated aqueous hydrochloric acid containing an HCl concentration of from 35 to 37.8 weight percent. At least 20 cubic centimeters of the acid are used for each gram of tungsten, expressed as tungstic oxide ($WO_3$), in the ore. This treatment allegedly dissolves both the tungsten and molybdenum values in the ores. The solution containing these values is separated from the residual insoluble material. The dissolved tungsten values subsequently are precipitated as the oxide while maintaining the molybdenum values in solution. Although this process is a more economical way than the conventional art processes for recovering tungsten in high purity from its ores, the solubility of tungsten in the concentrated aqueous hydrochloric acid employed in the process is rather low. Therefore, large amounts of the hydrochloric acid acidulating agent, with correspondingly large storage vesels and handling and tranfer equipment, must be employed.

Now, unexpectedly, the present invention provides a tungsten ore dissolution process whereby a marked increase in dissolved tungsten values per unit of dissolving agent is achieved over the prior art processes.

It is a principal object of the present invention to provide a novel, low temperature ore dissolution process whereby high purity tungsten values are recovered directly and in good yield.

It is another object of the present invention to provide a novel process for recovering tungsten from its ores wherein process plant size and reagent recycle requirements are markedly reduced over that required by known art processes.

In accordance with the process of the present invention, a tungsten bearing source material, usually a tungsten ore or ore concentrate such as scheelite or scheelite ore concentrate, is contacted at atmospheric or superatmospheric pressures and a temperature of from about 40 to about 70° C., preferably from about 50 to about 60° C., for a period of from about 0.25 to about 4 hours or more and preferably from about 0.5 to about 2 hours, with a concentrated alcoholic hydrogen halide solution thereby to dissolve the tungsten values contained in the source material. The resulting solution containing the dissolved tungsten values is separated from the insoluble residue of gangue and other solid impurity materials. The solution is heated above 70° C., ordinarily to about reflux, and/or otherwise reduced in hydrogen halide content by dilution, neutralization and the like whereupon high quality tungsten values precipitate directly therein.

The actual separation of the alcoholic hydrogen halide solution containing dissolved tungsten values from the residual solids readily is carried out by filtration, centrifugation, settling and decantation, or other traditional solid-liquid separation techniques as is apparent to one skilled in the art.

Conveniently, the tungsten values are precipitated by boiling the separated alcoholic hydrogen halide solution in order to reduce the hydrogen halide content. Preferably the hydrogen halide content of the solution is reduced by distilling off a portion of the solution. The distillate is recovered and can be used directly as make-up reagent for subsequent acidulation of additional tungsten source material. The resulting precipitated tungsten values readily are separated from the residual alcoholic hydrogen halide solution. An advantage of the present process is that with glass or glass-lined reactors the solid product readily is removed from the reactor. In an acidulation process employing concentrated aqueous hydrochloric acid acidulating agent, the resulting precipitated tungsten values adhere tenaciously to glass reactor walls and are difficult to remove from the reactor.

The separated tungstic acid can be washed substantially free of impurities. Concentrated aqueous hydrochloric acid (e.g. from about 6 to about 12 M HCl) is used as an initial wash to assure removal of undesirable elements or compounds which may have been absorbed, absorbed or otherwise associated with the precipitated tungsten product. Preferably there is added to this wash material about 0.05 weight percent $HNO_3$. This latter component assures development of the typical bright yellow color in tungstic oxide produced by calcining the precipitated tungstic acid product. This wash is effective in removing the bulk of the impurities. Dilute acid, e.g. 0.25% HCl, or salts, e.g. 1% $NH_4Cl$, or water can be used for subsequent washes of the product, if desired. Although water alone is satisfactory in these final washes, salt or weak acid solutions are preferred as washing with water alone sometimes converts the precipitated crystalline tungstic acid into a hard to handle colloidal form. The resulting tungstic acid ($H_2WO_4$) product can be dried and used directly, converted by ignition to the corresponding oxide ($WO_3$), or otherwise converted into useful tungsten compounds or materials.

In the present novel process, ordinarily the ore, ore concentrate or other tungsten source material is finely divided, i.e. ground or milled to pass a No. 200 U.S. Standard Sieve before acidulating with the alcoholic hydrogen halide solution. The large surface area to weight ratio present in the finely ground material assures a ready winning of the tungsten values in a shorter reaction time. However, this pretreatment is not critical or limiting as larger ore particles acidulate satisfactorily.

The alcohol component, i.e. solvent, of the acidulating agent is selected from the group consisting of aliphatic monohydric alcohols containing from 1 to 3 carbon atoms. The hydrogen halide, solute, is a member selected from the group consisting of hydrogen chloride and hydrogen bromide. Preferably an ethanolic hydrogen chloride solution containing from about 30 to about 33 weight percent HCl is used as acidulating agent.

The alcoholic hydrogen halide solution is employed either as a substantially anhydrous alcohol solution or an aqueous alcohol solution wherein up to about 70 percent of the alcohol has been replaced with water.

Ordinarily with a substantially anhydrous alcohol reagent, the alcohol is saturated with hydrogen halide. A saturated solution of hydrogen chloride dissolved in anhydrous ethanol at about 50° C. contains about 8.5 moles HCl per liter; on a weight basis this solution contains about 31.9 weight percent HCl. At about 60° C. substantially anhydrous ethanol saturated with HCl provides about a 7.6 molar solution; this solution, on a weight basis, has a HCl content of about 29.9 percent.

Aqueous alcoholic hydrogen chloride solutions within the alcohol-water composition range described hereinbefore, also provide unexpectedly high, effective tungsten dissolution markedly improved over that obtained from use of aqueous concentrated hydrochloric acid. In fact, aqueous ethanol hydrogen chloride solutions wherein from about 25 to about 60 volume percent of the ethanol is replaced with water, accommodates greater amounts of dissolved tungsten values than the substantially anhydrous ethanolic hydrogen chloride acidulating agent itself. Ordinarily, aqueous alcoholic hydrogen chloride solutions as are employed in the present process contain a hydrogen chloride concentration of about 33 weight percent hydrogen chloride.

Satisfactory high recoveries of tungsten values from tungsten source materials are obtained in the present process by use of sufficient alcoholic hydrogen halide solution such that the ratio of hydrogen halide in the acidulating solution to tungsten values in the ore, expressed as the weight ratio of HCl equivalent to tungstic oxide ($WO_3$) is at least about 3. Alcoholic solution in excess of the required amount can be used, if desired. Use of larger quantities of the solution can aid in the handling of the reaction mixture, promote material transfer and the like operations. Any unreacted acid, in excess of that required for acidulation of the ore, is not lost but can be recycled for subsequent treatment of additional tungsten source material.

The present process can be carried out in batch type, continuous or cyclic operations. Reactors, material handling and storage equipment and the like for use in the process are fabricated from materials which are substantially non-reactive with the reactants and products. Also, this processing equipment must have the requisite structural strength for operation at the specified reaction conditions.

The following examples will serve further to illustrate the present invention, but are not meant to limit it thereto.

*Example 1.*—About 14.0 grams of a scheelite ore concentrate assaying about 70% $WO_3$ was reacted at about atmospheric pressure and about 60° C. for one hour with about 100 milliliters aqueous ethanolic hydrogen chloride solution. The $HCl/WO_3$ weight ratio in the original reaction mix was about 3.4. The acidulating reagent was prepared by mixing 50 milliliters of an 11.8 molar aqueous hydrogen chloride solution and 50 milliliters of a 7.5 molar ethanolic hydrogen chloride solution. (The resulting aqueous ethanol [50—50 volume mixture] solution containing about 32 weight percent HCl.) Following the reaction period, the resulting solution was filtered to separate the acid insolubles therefrom. The solid residue was dried and weighed. The dry weight was about 0.42 gram. This residue upon analysis was found to contain about 0.075 gram $WO_3$ indicating solubilization of about 99.2% of the tungsten values into the ethanolic hydrogen chloride.

The resulting solution was heated at its boiling temperature for about twenty minutes, during which time it was concentrated to about 70 percent of its original volume and the temperature rose to about 90° C. As the solution became concentrated, a dense yellow precipitate of tungstic acid formed. This solid product was separated by filtration and washed. The dried $H_2WO_4$ product weighed 9.182 grams.

The resulting filtrate was distilled to recover the ethanol and HCl.

*Example 2.*—A tungstic acid product obtained by following the same procedural steps and reaction conditions as described in Example 1 was washed first with concentrated hydrochloric acid containing about 0.05 weight percent $HNO_3$, followed by dilute (0.25%) aqueous hydrochloric acid, dried and converted to tungstic oxide by ignition. The product was analyzed by emission spectrographic techniques. The analytical results are presented in Table I. The analysis of a known high purity tungstic acid product prepared with concentrated aqueous hydrochloric acid in accordance with the teaching of the Kasey patent, U.S. 2,801,152, also is included in Table I for comparative purposes.

TABLE I

| $WO_3$ Sample | Impurities, p.p.m. | | | | | | | | | | | | |
|---|---|---|---|---|---|---|---|---|---|---|---|---|---|
| | Al | B | Be | Ca | Cu | Fe | Mg | Mn | Mo | Na | Si | Ti | V |
| Pdt. from Alcoholic HCl | <10 | 5 | <10 | (*) | 1 | <10 | <10 | <10 | 300 | (*) | 90 | <100 | <100 |
| Pdt. from Aq. HCl (Kasey) | <10 | 4 | <10 | (*) | 2 | <10 | <10 | <10 | 270 | (*) | 400 | 150 | <100 |

*None detected.

*Example 3.*—A series of runs was made to determine the effectiveness of various hydrogen chloride leach solutions in dissolving tungsten from scheelite ore.

For this experiment, a weighed amount of scheelite ore concentrate (about 70% $WO_3$) was mixed with a known volume of solution in a screw-top type bottle; the bottle was capped and the resulting mixture was placed in a thermostated bath maintained at about 60° C. Following an extended contact period, about 28 hours, to assure that the system was at equilibrium, the solution was analyzed for tungsten content.

Table II which follows presents the results of this study.

TABLE II

| Run No. | Scheelite ore concentrate,[1] gm. | WO$_3$ | HCl Solution, ml. | | HCl, wt. gm. | Solution Analysis, WO$_3$ | | HCl, gm./gm. |
|---|---|---|---|---|---|---|---|---|
| | | | Ethanolic [2] | Aqueous [3] | | Gm./ml. | Percent dissolved | |
| 1 | 4.00 | 2.80 | ---------- | 20 | 8.12 | 0.050 | 36 | 0.123 |
| 2 | 4.00 | 2.80 | [4]10 | [4]10 | 6.80 | 0.100 | 72 | 0.294 |
| 3 | 4.00 | 2.80 | 20 | ---------- | 5.48 | 0.074 | 53 | 0.270 |

[1] Ore concentrate about 70% by weight WO$_3$.
[2] 7.50 M HCl in substantially anhydrous ethanol; about 29.3% HCl by weight.
[3] 11.1 M HCl in water; about 34.6% HCl by weight. Control.
[4] Mixed solution contains about 32.4% HCl by weight.

These equilibrium studies clearly show the improved solubilities of tungsten in an alcoholic hydrogen chloride solution as compared to the solubility of this same metal in a concentrated aqueous hydrochloric acid solution even though the HCl content of the aqueous solution was considerably greater than in the alcoholic HCl solution.

*Example 4.*—A number of tests were carried out evaluating the solubility of tungsten in a number of alcoholic hydrogen chloride solutions.

For this run, four grams of scheelite ore concentrate (70% WO$_3$) were weighed into a bottle, and a total of 20 milliliters of hydrogen chloride solution was added. The bottle then was sealed and rotated in a thermostated bath at 60° C. for about four hours. The results of these tests are presented in Table III which follows:

TABLE III

| Run No. | Alcoholic HCl solution (wt. percent HCl) | Tungsten solubility (tungsten oxide/liter solution) |
|---|---|---|
| 1. Methanol* | 29.9 | 97 |
| 2. Ethanol* | 29.9 | 75 |
| 3. Aqueous Ethanol (75% C$_2$H$_5$OH) | 31.1 | 100 |
| 4. Aqueous Propanol (75% C$_3$H$_7$OH) | 31.1 | 77 |
| 5. Aqueous Ethanol (50% C$_2$H$_5$OH) | 32.1 | 100 |
| 6. Aqueous Propanol (50% C$_3$H$_7$OH) | 32.1 | 57 |
| 7. Aqueous Ethanol (30% C$_2$H$_5$OH) | 33.0 | 70 |
| 8. H$_2$O (Control) | 34.3 | 50 |

*Substantially anhydrous.

In a manner similar to that described for the foregoing examples hydrogen bromide can be substituted for hydrogen chloride in the alcoholic acidulating agent employed in the novel process of the present invention.

I claim:

1. A process for recovering high purity tungsten values from tungsten source materials which comprises:
    (a) reacting a tungsten bearing source material with a concentrated alcoholic hydrogen halide solution acidulating agent at a temperature of from about 40 to about 70° C. for a period of from about 0.25 to about 4 hours employing an amount of said acidulating agent such that the original hydrogen halide/tungsten weight ratio of the reaction mix expressed as equivalent HCl/WO$_3$, is at least 3 thereby to dissolve substantially all of the tungsten values present in said tungsten containing source material, the alcohol component of said acidulating agent being a member selected from the group consisting of aliphatic monohydric alcohols containing from 1 to 3 carbon atoms, and the hydrogen halide being a member selected from the group consisting of HCl and HBr, said concentrated alcoholic hydrogen halide solution being saturated with said hydrogen halide based on said alcohol component being substantially anhydrous, and said alcoholic hydrogen halide solution being further characterized as having from 0 to about 70 volume percent of said alcohol replaced with water,
    (b) separating the resulting solution containing substantially all of the tungsten values present in said tungsten bearing source material from any undissolved solid residue,
    (c) treating said solution thereby to precipitate said tungsten values therein by reducing the hydrogen halide concentration therein,
    (d) separating said precipitated tungsten values from the residual solution and washing said precipitated tungsten values; and,
    (e) recovering said precipitated tungsten values as a high purity product.

2. A process for recovering tungsten values in high purity from a tungsten ore material which comprises:
    (a) reacting a tungsten bearing ore material with a concentrated alcoholic hydrogen chloride solution acidulating agent at a temperature of from about 50 to about 60° C. for a period of from about 0.5 to about 2 hours employing an amount of said acidulating agent such that the original HCl/tungsten ratio of the reaction mixture, expressed as HCl/WO$_3$, on a weight basis is at least 3 thereby to dissolve substantially all of the tungsten values present in said tungsten bearing ore material, said alcoholic hydrogen chloride acidulating agent having a HCl content ranging from about 30 to about 33 weight percent and the alcohol component of said acidulating agent being a member selected from the group consisting of methanol, ethanol, 1-propanol and 2-propanol, said alcoholic hydrogen chloride solution being further characterized as having from 0 to about 70 volume percent of said alcohol replaced with water,
    (b) separating the resulting alcoholic hydrogen chloride solution containing substantially all of the tungsten values present in said tungsten bearing ore material from any undissolved solid residue,
    (c) heating said solution to reflux thereby to precipitate said tungsten values therein as a high purity crystalline tungstic acid,
    (d) recovering said precipitated tungstic acid from said solution, and
    (e) washing said precipitated tungsten acid substantially free of impurities.

3. A process for recovering high purity tungsten values in high yield from a scheelite ore which comprises.
    (a) reacting a member selected from the group consisting of scheelite ores and scheelite ore concentrates with an ethanolic hydrogen chloride solution acidulating agent at a temperature of from about 50 to about 60° C. for a period of from about 0.5 to about 2 hours employing an amount of said acidulating agent such that the original HCl/tungsten ratio of the reaction mixture, expressed as HCl/WO$_3$, on a weight basis is at least about 3.4 thereby to dissolve substantially all of the tungsten values present in said scheelite, said ethanolic hydrogen chloride acidulating agent having an HCl content ranging from about 30 to about 33.5 weight percent, said ethanolic hydrogen chloride acidulating agent being further characterized as having from 0 to about 70 volume percent of the ethanol replaced by water,
    (b) separating the resulting ethanolic hydrogen chloride solution containing substantially all of the tungsten values originally present in said scheelite from the non-soluble residue, (c) concentrating said solution to about 70 volume percent of its original volume thereby to precipitate said tungsten values therein as a crystalline tungstic acid,
(d) recovering said precipitated tungstic acid from said solution, and
(e) washing said precipitated tungsten acid with concentrated hydrochloric acid.

4. The process as defined in claim 3 and including the steps of washing the recovered precipitated tungstic acid with concentrated aqueous hydrochloric acid containing about 0.05 weight percent $HNO_3$,
 (a) drying the washed product, and,
 (b) igniting the dried, washed tungstic acid thereby to provide a bright yellow, high purity tungstic oxide.

5. The process as defined in claim 3 wherein the ethanol solvent of said acidulating agent is a member selected from the group consisting of substantially anhydrous ethanol and aqueous ethanol solutions, said aqueous ethanol solution being at least about 50 volume percent ethanol.

6. The process as defined in claim 3 wherein the ethanol solvent of said acidulating agent is an aqueous ethanol solution containing from about 30 to about 75 volume percent ethanol and from about 70 to about 25 percent water.

References Cited by the Examiner

UNITED STATES PATENTS

| | | | |
|---|---|---|---|
| 984,143 | 2/1911 | Lederer | 23—21 |
| 2,366,250 | 1/1945 | Foulke et al. | 23—140 |
| 2,801,152 | 7/1957 | Kasey | 23—19 |
| 3,079,226 | 2/1963 | Newkirk | 23—19 |
| 3,193,347 | 7/1965 | Forward et al. | 23—140 |

OSCAR R. VERTIZ, *Primary Examiner.*

BENJAMIN HENKIN, MILTON WIESSMAN,
*Examiners.*

H. T. CARTER, *Assistant Examiner.*